United States Patent
Hong et al.

(10) Patent No.: US 9,430,052 B2
(45) Date of Patent: Aug. 30, 2016

(54) METHOD FOR CONTROLLING FUNCTION USING ELECTRONIC PEN AND ELECTRONIC DEVICE THEREOF

(71) Applicant: Samsung Electronics Co., Ltd., Suwon-si, Gyeonggi-do (KR)

(72) Inventors: Hyun-Ju Hong, Hwaseong-si (KR); Hyun-Jung Kim, Seoul (KR); Bo-Yeon Na, Suwon-si (KR); Yong-Sang Yun, Suwon-si (KR); Chang-Ryong Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 129 days.

(21) Appl. No.: 14/252,046

(22) Filed: Apr. 14, 2014

(65) Prior Publication Data
US 2014/0313171 A1  Oct. 23, 2014

(30) Foreign Application Priority Data
Apr. 18, 2013 (KR) .................. 10-2013-0043113

(51) Int. Cl.
| | |
|---|---|
| *G06F 3/02* | (2006.01) |
| *G06F 1/16* | (2006.01) |
| *G06F 3/0483* | (2013.01) |
| *G06F 3/0362* | (2013.01) |
| *G06F 3/0354* | (2013.01) |

(52) U.S. Cl.
CPC .......... *G06F 3/0227* (2013.01); *G06F 1/1626* (2013.01); *G06F 3/0362* (2013.01); *G06F 3/03545* (2013.01); *G06F 3/0483* (2013.01); *G06F 2200/1632* (2013.01); *G06F 2203/04806* (2013.01)

(58) Field of Classification Search
CPC ............... G06F 3/044; G06F 2203/04103; G06F 2203/04112; G06F 3/046; G06F 1/1626; G06F 2203/04806; G06F 3/0362; G06F 3/0483; G06F 2200/1632; G06F 3/0227; G06F 3/03545
USPC ........................................................ 345/184
See application file for complete search history.

(56) References Cited

U.S. PATENT DOCUMENTS

| | | | | |
|---|---|---|---|---|
| 6,681,333 | B1* | 1/2004 | Cho ....................... | G06F 1/1626 345/179 |
| 2004/0135765 | A1* | 7/2004 | Kinerk .................. | G06F 1/1626 345/156 |
| 2004/0212586 | A1* | 10/2004 | Denny, III ............ | G06F 1/1626 345/156 |
| 2004/0239702 | A1* | 12/2004 | Kang .................. | G06F 3/03545 715/863 |
| 2008/0036747 | A1* | 2/2008 | Hope .................... | G06F 1/1626 345/179 |
| 2011/0012849 | A1* | 1/2011 | Cho ...................... | G06F 1/1626 345/173 |

FOREIGN PATENT DOCUMENTS

| | | |
|---|---|---|
| JP | 11-175243 A | 7/1999 |
| JP | 2003-050668 A | 2/2003 |
| KR | 10-2009-0060553 A | 6/2009 |

* cited by examiner

*Primary Examiner* — Aneeta Yodichkas
*Assistant Examiner* — Chineyere Wills-Burns
(74) *Attorney, Agent, or Firm* — Jefferson IP Law, LLP

(57) ABSTRACT

A method for controlling a function of an electronic device by using an electronic pen and the electronic device are provided. The method of controlling the function of the electronic device includes determining a motion of an electronic pen inserted into the electronic device and confirming an operation corresponding to the determined motion of the electronic pen to perform the operation.

20 Claims, 14 Drawing Sheets

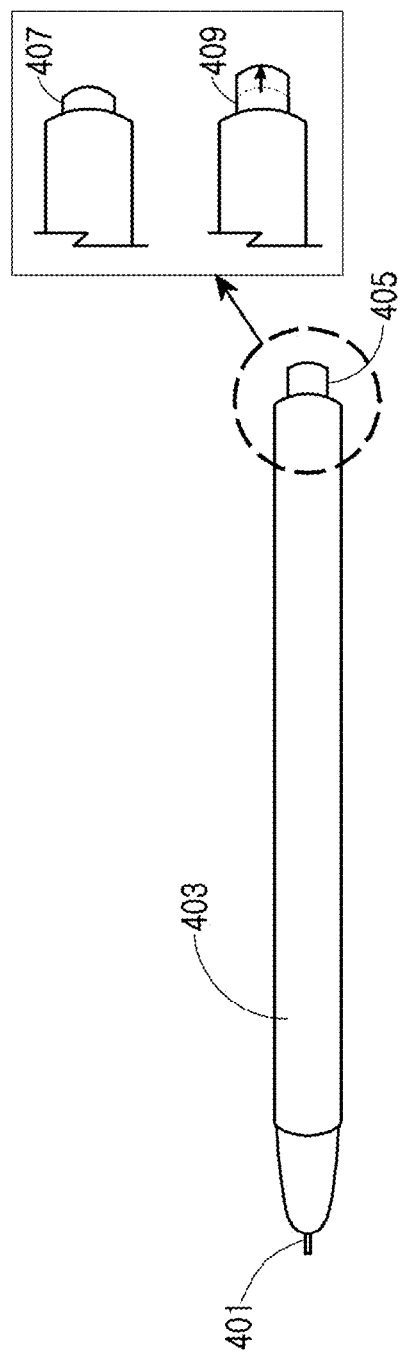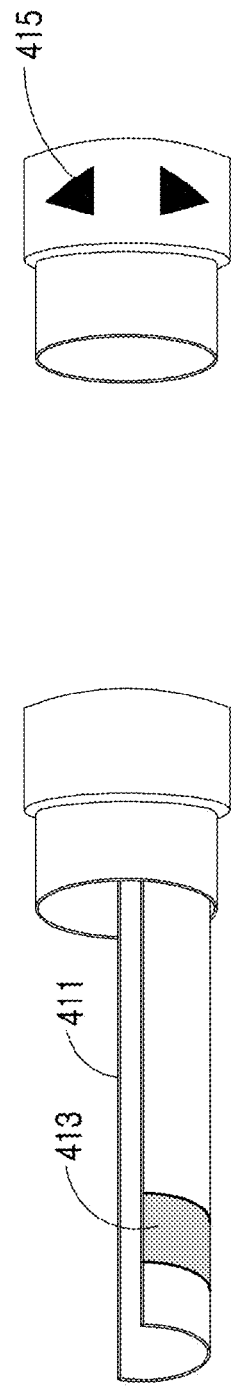
FIG.4A  FIG.4B  FIG.4C

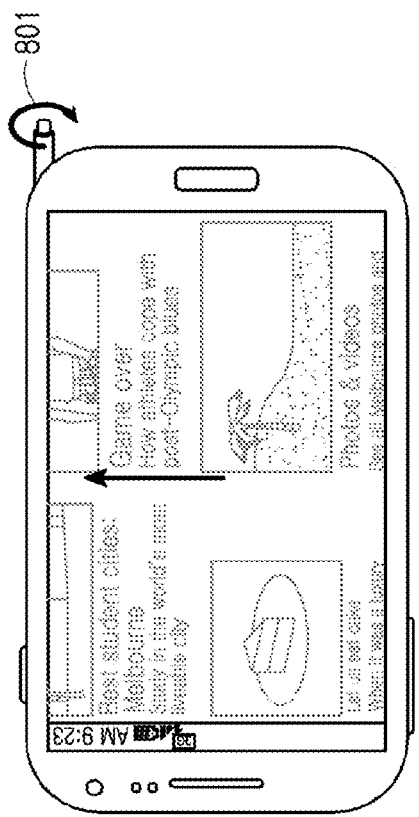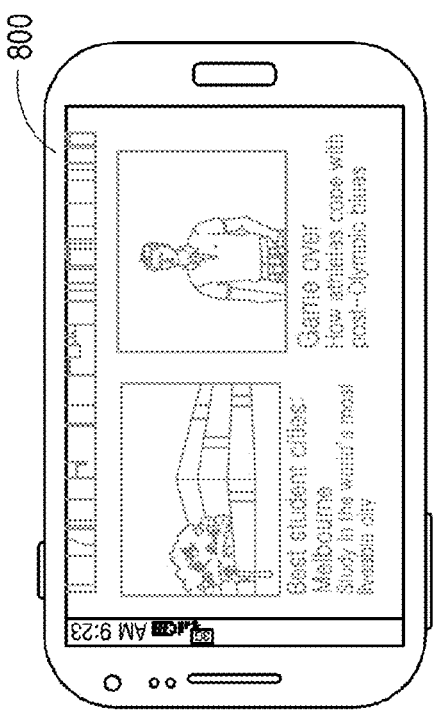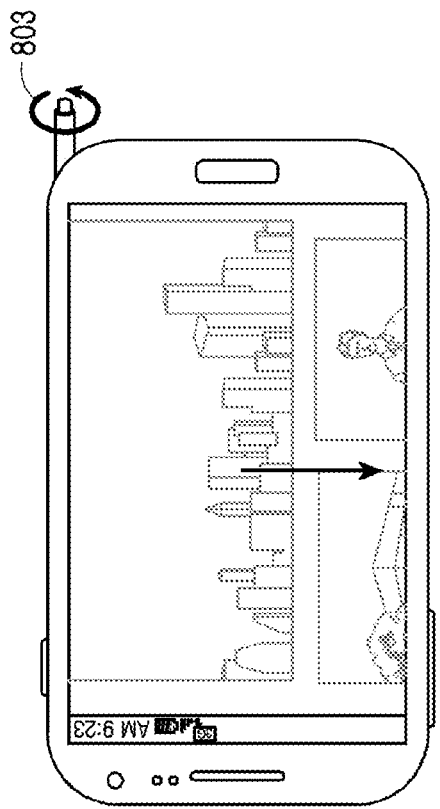
FIG.8A
FIG.8B
FIG.8C

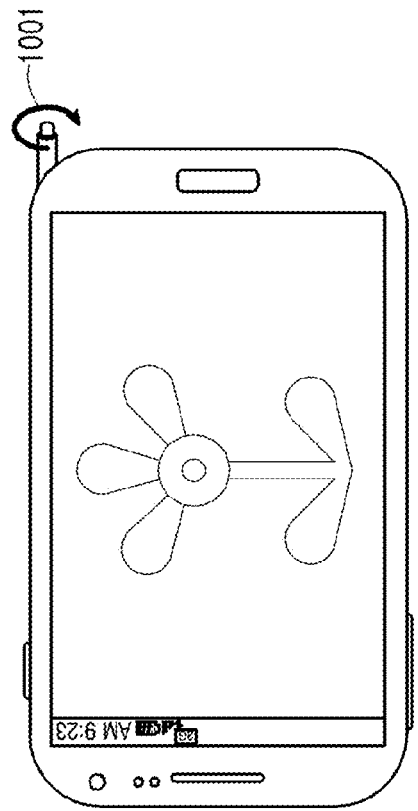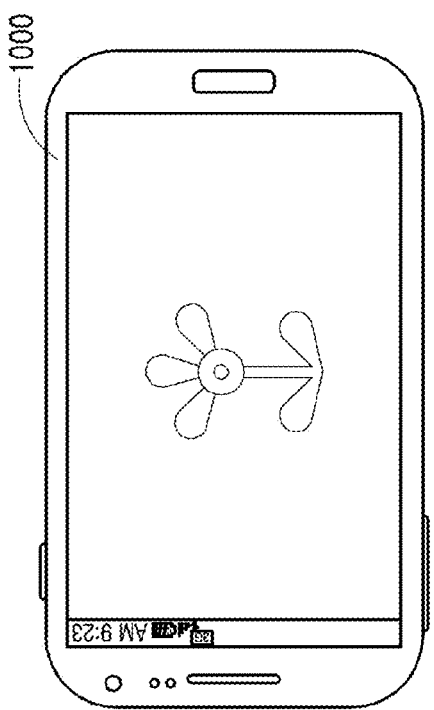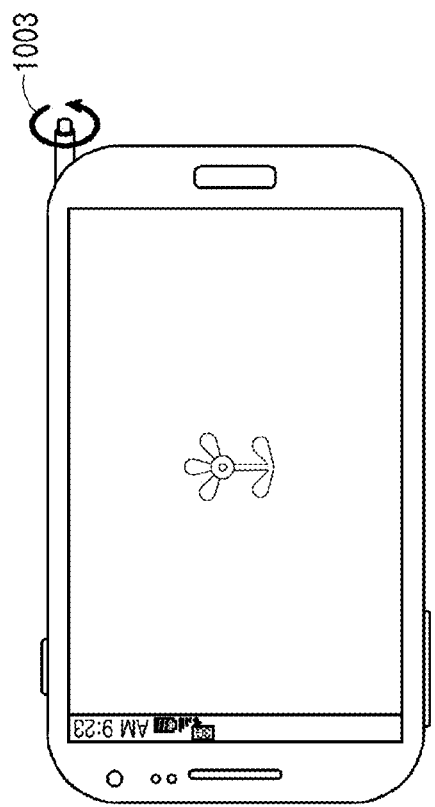
FIG.10B
FIG.10A
FIG.10C

METHOD FOR CONTROLLING FUNCTION USING ELECTRONIC PEN AND ELECTRONIC DEVICE THEREOF

CROSS-REFERENCE TO RELATED APPLICATION(S)

This application claims the benefit under 35 U.S.C. §119(a) of a Korean patent application filed on Apr. 18, 2013 in the Korean Intellectual Property Office and assigned Serial number 10-2013-0043113, the entire disclosure of which is hereby incorporated by reference.

TECHNICAL FIELD

The present disclosure relates to a method for controlling a function of an electronic device by using an electronic pen and an electronic device having the same.

BACKGROUND

Recently, with the rapid development of electronic devices, a mobile terminal providing wireless voice calls and exchanging data is regarded as a personal necessity. Electronic devices of the related art have generally been regarded as portable devices providing wireless calls. However, along with the technical advances and introduction of the wireless Internet, electronic devices are now used for many purposes in addition to simple telephone calls or scheduling. For example, the electronic device provides a variety of functions to satisfy users' demands, such as, games, remote controlling using near field communication, capturing images using a built-in digital camera, etc.

The electronic device also provides a video call service capable for performing a call function while watching an image of a recipient in addition to voice telephony.

Since the electronic device proposes a multimedia service as described above, an amount of information to be processed and an amount of information to be displayed have been increased. Accordingly, there is a growing interest on an electronic device employing a touch screen capable of increasing a size of a display element by improving space utilization.

The touch screen is an input and display device which inputs and displays information in one screen. Accordingly, when using the touch screen, the electronic device may remove an additional input device such as a keypad to increase a display area. For example, when using a full touch mechanism in which a touch screen is applied to the entirety of the screen, a front surface of the electronic device may be fully utilized as a screen to increase a screen size.

As a size and resolution of the display of the electronic device are competitively increased, there is also a growing user demand on a handwriting input, a drawing memo, etc.

For example, a user may mark a destination on a map or transmit a message written on a photo using the electronic device, which is an important marketing point. Thus, an electronic device supporting an electronic pen capable of satisfying such a user demand has been launched.

When the typical electronic pen approaches an electromagnetic field generated by the electronic device, an electromagnetic induction phenomenon occurs, thereby generating a magnetic field. Accordingly, the electronic device can detect an input of the electronic pen by detecting the magnetic field generated by the electronic pen.

In general, the electronic device can be inserted to the electronic device for storage. The user must use the electronic pen by pulling out the inserted electronic pen, and cannot perform any operation for controlling the electronic device when the electronic pen is in an insertion state.

In addition, the electronic pen can control only a limited function of the electronic device. For example, the electronic device may be used only for a case where an input is made by the electronic pen to write a memo, a case where an input is made by the electronic pen to edit the memo, and a case where an input is made to determine an image editing area. Accordingly, there is a need for an improved apparatus and method for controlling a function of an electronic device by using a motion of an electronic pen in the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for controlling a function of an electronic device by using a motion of an electronic pen in the electronic device.

Another aspect of the present disclosure is to provide a method and apparatus for controlling a function of an electronic device by detecting a rotation of an electronic pen in the electronic device.

Another aspect of the present disclosure is to provide a method and apparatus for controlling a function of an electronic device by detecting an insertion state and a motion state of an electronic pen in the electronic device.

Another aspect of the present disclosure is to provide a method and apparatus for controlling a function of an electronic device by using a motion of an electronic pen in an insertion state in the electronic device.

In accordance with an aspect of the present disclosure, a method of controlling a function of an electronic device is provided. The method includes determining a motion of an electronic pen inserted into the electronic device, and confirming an operation corresponding to the determined motion of the electronic pen to perform the operation.

In accordance with another aspect of the present disclosure, an electronic device apparatus for controlling a display area is provided. The apparatus includes at least one processor, a memory, and at least one program stored in the memory and configured to be executable by the at least one processor, wherein the program determines a motion of the electronic pen inserted into the electronic device, and confirms an operation corresponding to the determined motion to perform the operation.

In accordance with another aspect of the present disclosure, there is provided a computer-readable storage medium for storing one or more programs for executing an operation of determining a motion of an electronic pen inserted into an electronic device and an operation of confirming an operation corresponding to the determined motion of the electronic pen to perform the operation.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4A, 4B, and 4C illustrate a structure of an electronic pen for controlling a function of an electronic device according to an embodiment of the present disclosure;

FIGS. 8A, 8B, and 8C illustrate a process of controlling a web browser execution screen by using a motion of an electronic pen in an electronic device according to an embodiment of the present disclosure;

FIGS. 10A, 10B, and 10C illustrate a process of controlling an operation of an image viewer by using a motion of an electronic pen in an electronic device according to an embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a method and apparatus for controlling a function of an electronic device by detecting an insertion state and a motion state of an electronic pen in the electronic device will be described according to the present disclosure.

In addition, in the present disclosure, a gesture denotes an operation of forming a touch pattern in a touch screen of the electronic device. A touch is made on the touch screen of the electronic device by the use of an external input means such as a user's finger, an electronic pen, etc. The gesture implies an operation of performing a drag of a specific pattern in a state in which a touch is maintained in the touch screen. Optionally, the gesture may also imply an operation of performing up to a release of a drag and touch in a state in which the touch is maintained. In addition, the gesture implies a user's behavior for changing a motion of the electronic pen. The gesture may be a behavior of changing an insertion level of the electronic pen, a behavior of rotating the electronic pen, etc.

In addition, such an electronic device may be a portable electronic device, and may be a device such as a portable terminal, a mobile phone, a mobile pad, a media player, a tablet computer, a handheld computer, or a Personal Digital Assistant (PDA). In addition, it may be any portable electronic device including a device which combines two or more functions of these devices.

Figure 1:
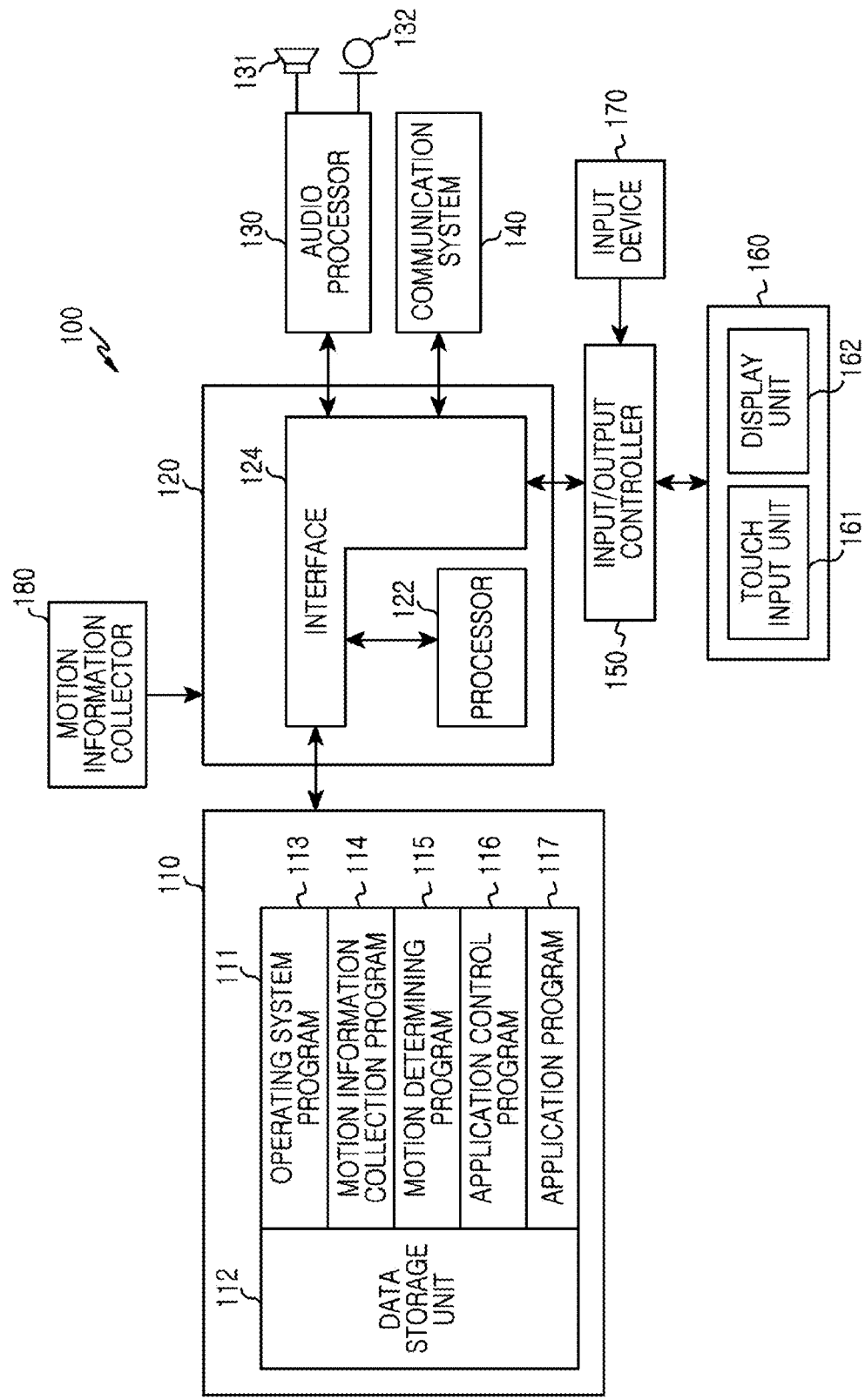
FIG. 1 is a block diagram illustrating a structure of an electronic device for controlling a function by using a motion of an electronic pen according to an embodiment of the present disclosure.

FIG. 1 is a block diagram illustrating a structure of an electronic device for controlling a function by using a motion of an electronic pen according to an embodiment of the present disclosure.

Referring to FIG. 1, an electronic device 100 includes a memory 110, a processor unit 120, an audio processor 130, a communication system 140, an input/output controller 150, a touch screen 160, an input device 170, and a motion information collector 180. Herein, the memory 110 and the communication system 140 may be plural in number.

Each constitutional element is described as follows.

The memory 110 includes a program storage unit 111 for storing a program for controlling an operation of the electronic device 100 and a data storage unit 112 for storing data generated during the program is executed. For example, the data storage unit 112 stores a variety of rewritable data, such as phonebook entries, outgoing messages, incoming messages, etc., and, according to the present disclosure, stores information which is a criterion of determining a motion of an electronic pen according to the present disclosure.

For example, the motion of the electronic pen may be a rotation angle of the electronic pen. The electronic device 100 may include a circuit capable of determining the strength of a magnetic field. The electronic pen may include a magnetic material. In this case, the circuit capable of determining the strength of the magnetic field may change the strength of the magnetic field to a voltage level by detecting the magnetic field generated by the magnetic material of the electronic pen. When the electronic pen rotates, a location of the magnetic material may also change. Thus, the strength of the magnetic field may also change according to the location of the magnetic material. Therefore, the voltage level measured by the circuit capable of determining the strength of the magnetic field may vary along with the change in the strength of the magnetic field.

For example a rotation angle of the electronic pen may be defined according to the voltage level and may be stored in the data storage unit 112.

For another example, the electronic device 100 may measure an impedance value which varies depending on an influence of the magnetic field of the electronic pen. Accordingly, the rotation angle of the electronic pen may be defined according to the impedance value and may be stored in the data storage unit 112.

For another example, the electronic device 100 may receive information on the motion of the electronic pen from the electronic pen. That is, the electronic pen mentioned in the present disclosure may include a sensor capable of measuring an angular velocity, acceleration, terrestrial magnetism, etc., to collect information required to determine a motion, such as a rotation state, an insertion state, etc. In this case, the electronic pen may provide the collected information to the electronic device so that the electronic device determines the motion of the electronic pen, or may autonomously determine the motion by using the collected information. In addition, the electronic pen may provide the collected information and/or the autonomously determined motion to the electronic device by using a wired/wireless interface. Motion information (e.g., the rotation state, the insertion state, etc.) based on information received from the electronic pen may be stored in the data storage unit 112.

In addition, the data storage unit 112 may store a function control scheme for each motion of the electronic pen.

The function control scheme may be defined for each application that can be controlled by using the motion of the electronic pen.

In addition, the program storage unit 111 includes an operating system program 113, a motion information collection program 114, a motion determining program 115, an application control program 116, and at least one application program 117. Herein, the program included in the program storage unit 111 is a set of instructions, and can be expressed as an instruction set.

The operating system program 113 includes various software components for controlling a general system operation. The control of the general system operation implies, for example, memory management and control, storage hardware (device) control and management, power control and management, etc. The operating system program 113 also performs a function of facilitating communication between various hardware (device) and program components (modules).

The motion information collection program 114 collects information used to determine the motion of the electronic pen. The motion of the electronic pen may be the rotation state, insertion state, etc., of the electronic pen.

For example, the rotation state of the electronic pen may be determined by detecting a magnetic field generated in the electronic pen. In this case, the motion information collection program 114 may collect a voltage level measured according to an influence of the magnetic field of the electronic pen in a circuit capable of determining strength of the magnetic field.

In addition, the motion information collection program 114 may collect a measured impedance value which varies depending on the influence of the magnetic field of the electronic pen.

In addition, the motion information collection program 114 may collect, from the electronic pen, information required to determine a motion, such as the rotation state, the insertion state, etc., autonomously collected by the electronic pen. In addition, the motion information collection program 114 may collect, from the electronic pen, motion information determined by the electronic pen.

The motion information collection program 114 provides the aforementioned collected information to the motion determining program 115.

The motion determining program 115 determines the motion of the electronic pen on the basis of the information collected by the motion information collection program 114. Herein, the motion of the electronic pen may be the rotation state, insertion state, etc., of the electronic pen as described above.

The motion determining program 115 may determine the insertion state of the electronic pen by using the strength of the magnetic field detected from the electronic pen. A magnetic material may exist inside the electronic pen, and a distance between the magnetic material and the circuit capable of determining the strength of the magnetic field changes according to the insertion state.

For example, on the basis of the distance between the magnetic material and the circuit capable of determining the strength of the magnetic field in the insertion state, the motion determining program 115 may determine that the electronic pen is being pulled out when the distance is increased.

The insertion state of the electronic pen is determined as described above to extend a function that can be controlled by the electronic pen. For example, when using only the rotation state of the electronic pen, two functions of the electronic device can be controlled in a rotation state for a first direction and a rotation state for a second direction, but when considering up to the insertion state, a controllable function may increase by n-fold. That is, when a first insertion state and a second insertion state are defined, four functions of the electronic device can be controlled in a rotation state for the first and second directions in each insertion state.

In addition, the motion determining program 115 may determine the rotation state of the electronic pen by using a voltage level measured by a magnetic field generated in the electronic pen. For example, the rotation of the electronic pen implies that a magnetic material existing therein rotates, and a distance between the magnetic material and the circuit capable of determining the strength of the magnetic field may vary depending on the rotation of the electronic pen.

Accordingly, the motion determining program 115 may measure the rotation state (i.e., rotation angle) of the electronic pen by using a voltage level based on a variable location of the magnetic material.

In addition, the motion determining program 115 may determine the rotation state of the electronic pen by using an impedance value which varies depending on a magnetic field generated in the electronic pen.

For example, the rotation of the electronic pen implies that a magnetic material existing therein rotates, and a distance between the magnetic material and the circuit capable of determining the strength of the magnetic field may vary depending on the rotation of the electronic pen.

Accordingly, the motion determining program 115 may measure the rotation state (i.e., rotation angle) of the electronic pen by using an impedance value based on a variable location of the magnetic material.

The motion determining program 115 provides the determined motion of the electronic pen to the application control program 116.

The application control program 116 executes a control function for the motion of the electronic pen.

In this case, when the motion of the electronic pen is confirmed, the application control program 116 confirms a function for controlling an application executed by using the motion and performs a function corresponding to the motion.

For example, the application control program 116 may change a display ratio of an image according to the motion of the electronic pen in a state in which an image viewer is executed.

For another example, the application control program 116 may scroll a displayed screen in a pre-set direction according to the motion of the electronic pen in a state in which a web browser is executed.

For another example, the application control program 116 may change a playback duration and sound volume of data in a pre-set range according to the motion of the electronic pen in a state in which a multimedia player is executed.

The application control program 116 includes a software constitutional element for at least one application program installed in the electronic device 100.

In addition, the program storage unit 111 may include a display program (not shown) including several software constitutional elements for providing and displaying graphics on the touch screen 160.

The terminology of "graphics" indicates a text, a web page, an icon, a digital image, a video, an animation, etc.

In addition, the display program includes several software constitutional elements related to a user interface.

That is, the display program displays a process of controlling a function by using the electronic pen. For example, the display program may display an image viewer execution screen in which an image enlargement ratio varies depending on the motion of the electronic pen. For another example, the display program may display a web browser execution screen in which a scroll location varies depending on the motion of the electronic pen. For another example, the display program may display a multimedia player execution screen in which a playback duration, a sound volume control, etc., vary depending on the motion of the electronic pen.

The processor unit 120 includes at least one processor 122 and an interface 124. Herein, the processor 122 and the interface 124 may be integrated as at least one integrated circuit or may be implemented as separate components.

The interface 124 takes a role of a memory interface for controlling an access of the processor 122 and the memory 110.

In addition, the interface 124 takes a role of a peripheral device interface for controlling a connection of the processor 122 and an input/output peripheral device of the electronic device 100.

The processor 122 allows the electronic device to be controlled according to the motion of the electronic pen by using at least one software program. In this case, the processor 122 executes at least one program stored in the memory 110 to control a function corresponding to the program. For example, the processor 122 may include a control processor for controlling the electronic device according to the motion of the electronic pen.

That is, the function control of the electronic device 100 may be performed in software such as a program stored in the memory 110 or in hardware such as the control processor.

The audio processor 130 provides an audio interface between the user and the electronic device 100 via a speaker 131 and a microphone 132.

The communication system 140 performs a communication function for voice communication and data communication of the electronic device 100. In this case, the communication system 140 may be divided into a plurality of communication sub-modules for supporting different communication networks. For example, although not limited thereto, the communication network includes a Global System for Mobile Communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a Wireless Local Area Network (WLAN), a Bluetooth network, Near Field Communication (NFC), etc.

The communication system 140 may include a near field wireless communication module for near field wireless communication. The electronic device may receive motion information, state, etc., autonomously determined by the use of the electronic pen by communicating with the electronic pen via the communication system 140.

The input/output controller 150 provides an interface between an input/output device (e.g., the touch screen 160, the input unit 170, etc.) and the interface 124.

The touch screen 160 is an input/output device for performing information input and information output, and includes a touch input unit 161 and a display unit 162.

The touch input unit 161 provides touch information sensed via a touch panel to the processor unit 120 via the input/output controller 150. In this case, the touch input unit 161 provides the touch information to the processor unit 120 by changing the information in an instruction format such as touch_down, touch_move, and touch_up, and generates a user's gesture for entering a mode of controlling the electronic device by using the electronic pen according to the present disclosure.

The display unit 162 displays status information of the electronic device 100, a character input by the user, a moving picture, a still picture, etc. For example, the display unit 162 displays a process of controlling a function of the electronic device by using the electronic pen. For example, the display unit 162 may display an image viewer execution screen in which an image enlargement ratio varies depending on the motion of the electronic pen. For another example, the display unit 162 may display a web browser execution screen in which a scroll location varies depending on the motion of the electronic pen. For another example, the display unit 162 may display a multimedia player execution screen in which a playback duration, a sound volume control, etc., vary depending on the motion of the electronic pen.

Although not shown, the touch screen 160 may include a capacitive touch panel, a touch panel controller, a display panel, a digitizer pad, a digitizer pad controller, etc.

The input unit 170 provides input data generated by a selection of the user to the processor unit 120 via the input/output controller 150. For example, the input unit 170 includes only control buttons for the control of the electronic device 100. For another example, the input unit 170 consists of a key pad for receiving input data from the user, and generates a user's gesture for entering a mode of controlling the electronic device by using the electronic pen according to the present disclosure.

Although not shown, the electronic device 100 may further include constitutional elements for providing an additional function such as a broadcast receiving module for broadcast reception, a digital sound source reproducing module such as an MPEG-1 Audio Layer 3 (MP3) module, a near field communication module for near field communication, a proximity sensor for proximity sensing, etc., and a software element for operating the components.

Figure 2A:
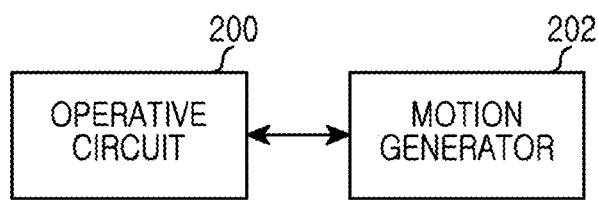
FIGS. 2A and 2B illustrate a block diagram of an electronic pen for controlling an electronic device by using a motion according to an embodiment of the present disclosure.
Figure 2B:
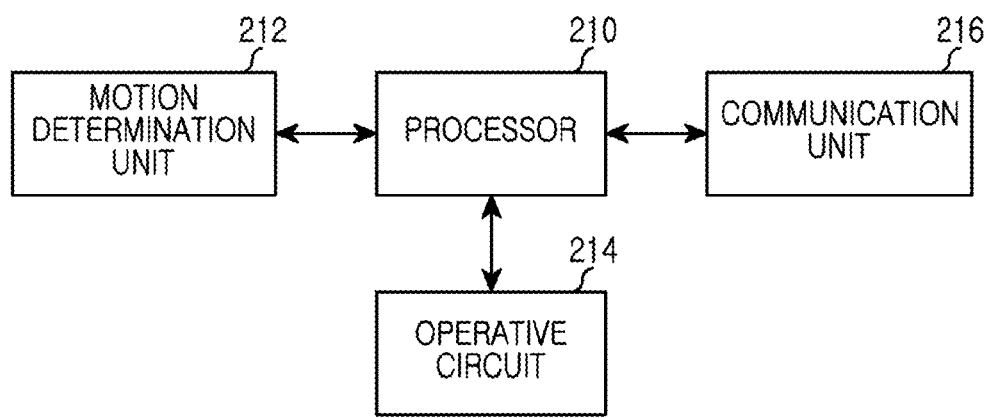

FIGS. 2A and 2B illustrate a block diagram of an electronic pen for controlling an electronic device by using a motion according to an embodiment of the present disclosure.

Referring to FIGS. 2A and 2B, the electronic pen may generate a motion so that the electronic device determines the motion, or the electronic pen may autonomously determine the motion and provide this to the electronic device.

First, FIG. 2A illustrates a structure of an electronic pen for allowing the electronic device to determine a motion according to an embodiment of the present disclosure.

Referring to FIG. 2A, the electronic pen may include an operative circuit 200 and a motion generator 202.

The operative circuit 200 controls an operation of the electronic pen. In addition, the operative circuit 200 is a module for generating a magnetic field of the electronic pen, and may be a resonance circuit for generating the magnetic field in response to an electromagnetic field of the electronic device.

For example, the electronic device may include a touch screen on which a digitizer pad, a display pad, and a window are laminated in that order.

The digitizer pad generates an electromagnetic field by an alternate current supplied thereto. The operative circuit of the electronic pen may form a magnetic field by the electromagnetic field of the electronic device.

The electronic device may detect an input of the electronic pen by detecting the magnetic field generated by the electronic pen.

The motion generator 202 generates information by which a motion of the electronic pen can be detected in the electronic device.

Herein, the motion of the electronic pen may be in a rotation state of the electronic pen, which is defined to control a function of the electronic device. Such a rotation state may be confirmed by a change in a magnetic field generated in the electronic pen.

For example, the motion generator 202 may include a magnetic material. The magnetic material may rotate along with the rotation of the electronic pen.

The magnetic material may generate a magnetic field. According to a location of the magnetic material, the strength of the magnetic field detected by the electronic device may differ.

For example, the electronic device may pre-define the change in the magnetic field according to the rotation state of the electronic pen, and thereafter may determine the motion of the electronic pen by using the strength of the detected magnetic field.

For another example, the motion generator 202 may include a button for generating information corresponding to the motion of the electronic device. That is, the electronic device may determine the motion of the electronic pen by using the information generated by an input of the button.

FIG. 2B illustrates a structure of an electronic pen for allowing an electronic device to determine a motion according to an embodiment of the present disclosure.

Referring to FIG. 2B, the electronic pen may include a processor 210, a motion determination unit 212, an operative circuit 214, and a communication unit 216.

The electronic pen can autonomously detect a motion change as described above. The processor 210 performs an operation for determining the motion of the electronic pen, and delivers information on the motion of the electronic pen to the electronic device.

The operative circuit 214 is a module for generating a magnetic field of the electronic pen, and may be a resonance circuit for generating the magnetic field in response to an electromagnetic field of the electronic device.

In addition, the motion determination unit 212 determines a rotation state and an insertion state of the electronic pen, and may include a sensor capable of measuring an acceleration, a rotation, a tilt, a height, etc., to determine the motion of the electronic pen by using the sensor.

The communication unit 216 may be connected to the electronic device via near field communication. In this case, the communication unit 216 transmits to the electronic device the motion of the electronic pen, determined by the motion determination unit 212. For example, the electronic pen may provide the autonomously determined motion to the electronic device via Bluetooth communication.

The electronic pen may determine the motion by using information collected via the aforementioned sensor, and may provide the information collected via the sensor to the electronic device. Accordingly, the electronic device may determine the motion of the electronic pen on the basis of the information provided from the electronic pen.

According to various embodiments, the electronic device for controlling a display area may include at least one processor, a memory, and at least one program stored in the memory and configured to be executable by the at least one processor. The program may include an instruction for determining the motion of the electronic pen and for confirming an operation corresponding to the determined motion to perform the operation.

According to various embodiments, the program may include an instruction for determining the motion of the electronic pen as to at least any one of an insertion state of the electronic pen and a rotation state of the electronic pen.

According to various embodiments, the program may include an instruction for determining the motion of the electronic pen, and thereafter for confirming whether a button of the electronic pen is input, and for confirming an operation corresponding to the input button to perform the operation.

According to various embodiments, the program may include an instruction for determining a motion for any one of a state in which the electronic pen is completely inserted, a state in which the electronic pen is partially inserted, and a state in which the electronic pen is pulled out.

According to various embodiments, the program may include an instruction for receiving determined motion information from the electronic pen.

According to various embodiments, the program may include an instruction for determining the motion of the electronic device on the basis of at least any one of a voltage level which varies depending on a magnetic material and strength of a magnetic field, an impedance value, and information obtained by the sensor included in the electronic pen.

According to various embodiments, the program may include an instruction for receiving information on at least any one of an angular velocity, an acceleration, and a terrestrial magnetism from the electronic pen.

According to various embodiments, the program may include an instruction for receiving information related to the motion from the electronic device by using a wireless and/or wired interface.

According to various embodiments, the program may include an instruction for controlling a function of an application which is executed according to the motion of the electronic pen, and the application may include at least any one of a camera, an image viewer, a multimedia player, a web browser, an e-book viewer, and a lock screen.

Figure 3:
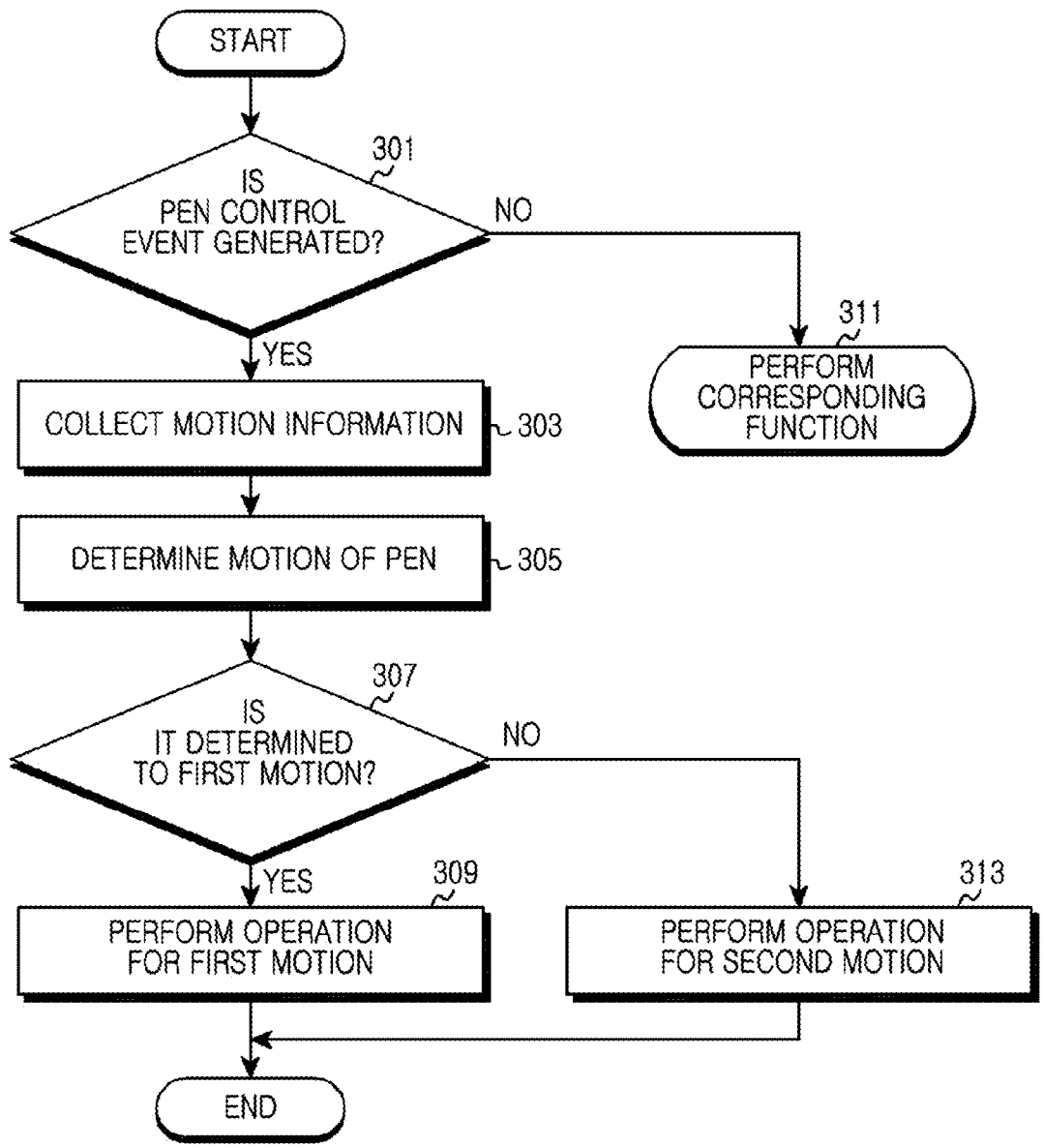
FIG. 3 is a flowchart illustrating a process of controlling a function by using a motion of an electronic pen in an electronic device according to an embodiment of the present disclosure.

FIG. 3 is a flowchart illustrating a process of controlling a function by using a motion of an electronic pen in an electronic device according to an embodiment of the present disclosure.

Referring to FIG. 3, the electronic device determines whether a pen control event is generated in operation 301. Herein, the pen control event implies an event for controlling a function of the electronic device by using the electronic pen which is an input means of the electronic device.

In addition, the electronic device by using the electronic pen may be controlled for the function of the electronic device in a state in which the electronic pen is inserted, and may be controlled for the function of the electronic device in a state in which the electronic pen is partially pulled out.

In addition, the electronic device's function that can be controlled by the electronic pen may be not for generating input data for simple text editing but for controlling an operation of an executed application.

If the pen control event is not generated in operation 301, proceeding to operation 311, the electronic device performs a corresponding function (e.g., standby mode).

Otherwise, if the pen control event is generated in operation 301, the electronic device collects motion information of the electronic pen in operation 303, and thereafter determines a motion of the electronic pen in operation 305. Herein, the motion of the electronic pen may be a rotation state, insertion state, etc., of the electronic pen.

The electronic device may determine the motion of the electronic pen by detecting a magnetic field of the electronic pen which includes a magnetic material according to an embodiment of the present disclosure.

For example, the electronic device may include a circuit capable of determining the strength of the magnetic field, and the electronic pen may include the magnetic material.

The circuit capable of determining the strength of the magnetic field converts the strength of the magnetic field into a voltage level. The electronic device may pre-store the voltage level for the motion of the electronic pen, and thereafter may determine the motion of the electronic pen by using the voltage level measured by the circuit.

For another example, the electronic device may pre-store an impedance value for the motion of the electronic pen, and thereafter may determine the motion of the electronic device by using the impedance value which varies according to an influence of the magnetic field of the electronic pen.

For another example, the electronic device may receive information required to determine the motion from the electronic pen, or may receive determined motion information from the electronic pen. Of course, in this case, the electronic pen may include a sensor capable of measuring an angular velocity, acceleration, terrestrial magnetism, etc., to collect information required to determine a motion, such as a rotation state, an insertion state, etc., or may autonomously determine the motion by using the collected information.

In operation 307, the electronic device confirms a result of determining the motion of the electronic pen.

The motion of the electronic pen may be a rotation state of the electronic pen as described above. That is, the electronic device may determine a first motion in which the electronic pen rotates in a first direction (i.e., from down to up) and a second motion in which the electronic pen rotates in a second direction (i.e., from up to down).

In addition, the motion of the electronic pen may be in an insertion state of the electronic pen. That is, the electronic device may determine the motion of the electronic pen which is inserted in a first section and which rotates in the first direction or the second direction. In addition, the electronic device may determine the motion of the electronic pen which is inserted in a second section and which rotates in the first direction or the second direction. Herein, the first section and the second section are for distinguishing a depth by which the electronic pen is inserted.

If it is determined in operation 307 that the motion of the electronic pen is the first motion, proceeding to operation 309, the electronic device performs an operation for the first motion.

Otherwise, if it is determined in operation 307 that the motion of the electronic pen is the second motion, proceeding to operation 313, the electronic device performs an operation for the second motion.

The operation for the motion implies an operation for controlling a function of the electronic device, that is, an operation for controlling a function of an application executed in the electronic device. The operation for each motion may be defined by a user.

For example, the electronic device may automatically execute a message function as to the operation for the first motion, and may automatically execute a camera function as to the operation for the second motion.

In addition, the electronic device may increase a display ratio as to the operation for the first motion of the electronic pen in a state in which the application is executed, and may decrease the display ratio as to the operation for the second motion.

In addition, in the state in which the application is executed, the electronic device may distinguish a function to be controlled according to an insertion state of the electronic pen. That is, if the electronic pen is inserted in the first section, the electronic device determines to control a sound volume, and if the electronic pen is inserted in the second section, the electronic device determines to regulate the display ratio.

Accordingly, the electronic device may decrease or increase the sound volume according to a rotation of the electronic pen inserted in the first section, and may increase or decrease the display ratio according to a rotation of the electronic pen inserted in the second section.

After performing the operation for the motion of the electronic pen as described above, the procedure of FIG. 3 ends.

Although the electronic device directly determines the motion of the electronic pen and performs a function corresponding to the determined motion in the method of FIG. 3, the electronic pen of the present disclosure can directly determine its motion.

That is, the electronic device of the present disclosure may receive information on the motion determined by the electronic pen from the electronic pen, and may perform a function corresponding to the received information.

FIGS. 4A, 4B, and 4C illustrate a structure of an electronic pen for controlling a function of an electronic device according to an embodiment of the present disclosure.

Referring to FIG. 4A, the electronic pen is formed as a pen having a tip 401, and includes a housing 403 having a housing space. In addition, the electronic pen of the present disclosure includes a rotation unit 405 for changing a motion of the electronic pen.

The housing 403 includes an operative circuit for generating a magnetic field of the electronic pen. Such an operative circuit may be a resonance circuit for generating the magnetic field in response to an electromagnetic field of the electronic device.

In addition, the rotation unit 405 may generate an interrupt for executing a pen control mode in a shape of a push/pull type, and may change a motion of an inserted electronic pen.

For example, the rotation unit 405 may not protrude to an outer side in a state in which the electronic pen is inserted (see 407). When the rotation unit 405 is pressed by a user, the rotation unit 405 may protrude to the outer side (see 409).

The electronic pen may include a magnetic material. The magnetic material may be fixed inside the electronic pen, or may rotate inside the electronic pen.

That is, the rotation unit 405 may be designed to be connected to the housing 403 of the electronic pen so that it does not rotate in separation of the housing 403. Accordingly, when the rotation unit 405 rotates, the electronic pen rotates. That is, a magnetic material fixed inside the electronic pen rotates along with the rotation of the rotation 405.

In addition, the rotation unit 405 may be designed to rotate independently in separation of the housing of the electronic pen. In this case, as illustrated in FIG. 4B, the rotation unit 405 is connected to a magnetic material 413 inside the electronic pen (see 411), so that a rotatable magnetic material rotates inside the electronic pen along with the rotation of the rotation unit 405.

The magnetic material inside the electronic pen is for generating a magnetic field to be used to distinguish a motion for controlling a function of the electronic device.

Instead of the magnetic material, the electronic pen of the present disclosure may be designed to include an input unit for generating input data to control the function of the electronic device as illustrated in FIG. 4C.

That is, the rotation unit 405 may have an input button 415 to control the function of the electronic device by generating input data corresponding to a button which is input by a user in a state in which the rotation unit 405 protrudes. In this case, although not shown, the electronic pen may include a module capable of communicating with the electronic device, and may provide the input data corresponding to the button to the electronic device by using a communication module.

In addition, as described above, the electronic pen may include a sensor capable of measuring an angular velocity, an acceleration, a terrestrial magnetism, etc., to collect information required to determine a motion, such as a rotation state, an insertion state, etc., and to provide the collected information to the electronic device, or may autonomously determine the motion by using the collected information and provide it to the electronic device.

Figure 5A:
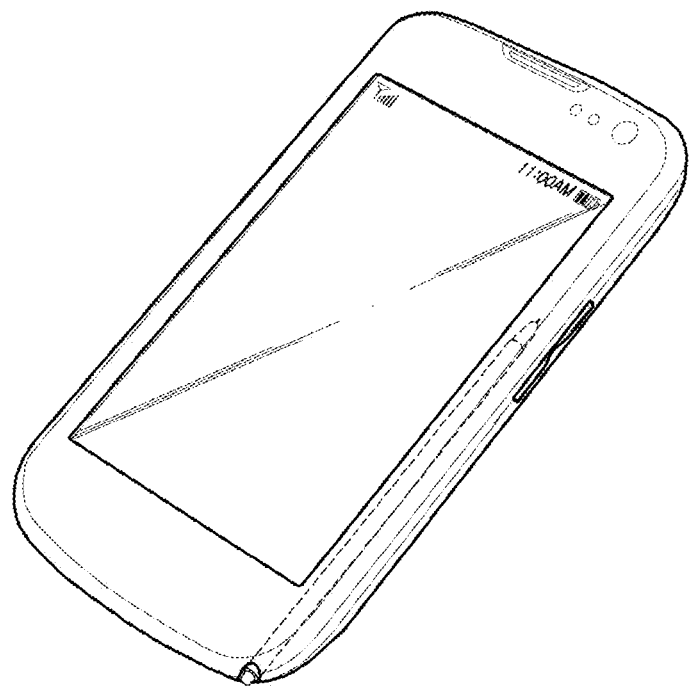
FIGS. 5A and 5B illustrate a situation in which a pen control mode is activated in an electronic device according to an embodiment of the present disclosure.
Figure 5B:
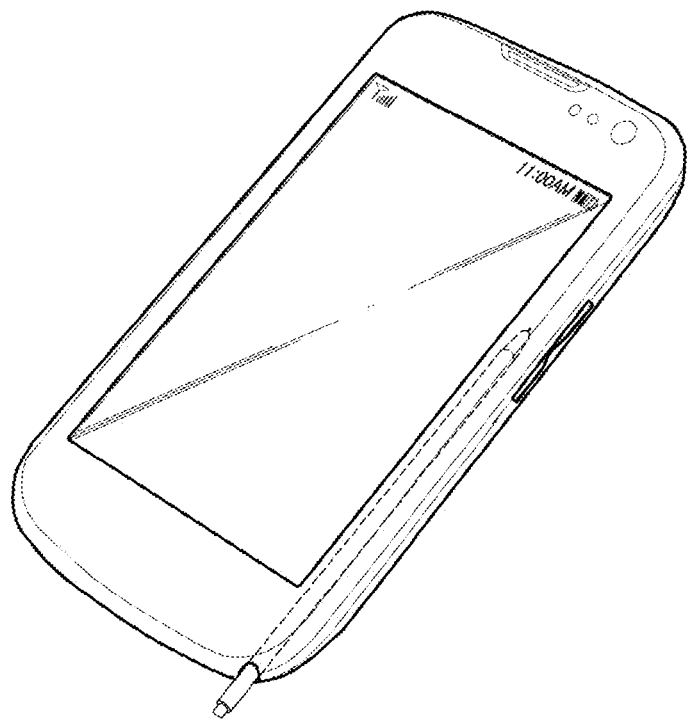

FIGS. 5A and 5B illustrate a situation in which a pen control mode is activated in an electronic device according to an embodiment of the present disclosure.

Referring to FIGS. 5A and 5B, the electronic device may activate the pen control mode by detecting an interrupt signal generated by the electronic pen or an interrupt signal generated by a menu selection of a user.

Herein, the interrupt generated by the menu selection of the user may be generated by an input of an input button included in the electronic device or may be generated by a gesture of a user who selects a displayed menu.

In addition, the interrupt generated by the electronic pen may be generated by a motion of the electronic pen.

For example, the electronic pen may include a rotation unit in a shape of a push/pull type. Thus, a state of the rotation unit varies depending on a behavior of a user who presses the rotation unit. Herein, the state of the rotation unit is changed when the rotation unit inserted in a housing of the electronic pen is pulled out or when the rotation unit pulled out from the housing is inserted into the housing.

That is, the electronic pen of the present disclosure may generate an interrupt for controlling the pen control mode according to the change in the state of the rotation unit as described above, and the electronic unit may activate the pen control mode by detecting the interrupt generated according to the change in the state of the rotation unit.

FIG. 5A illustrates a state in which the electronic pen is inserted to the electronic device, and FIG. 5B illustrates a situation in which only the rotation unit of the electronic pen inserted to the electronic device is pulled out.

Figure 6A:
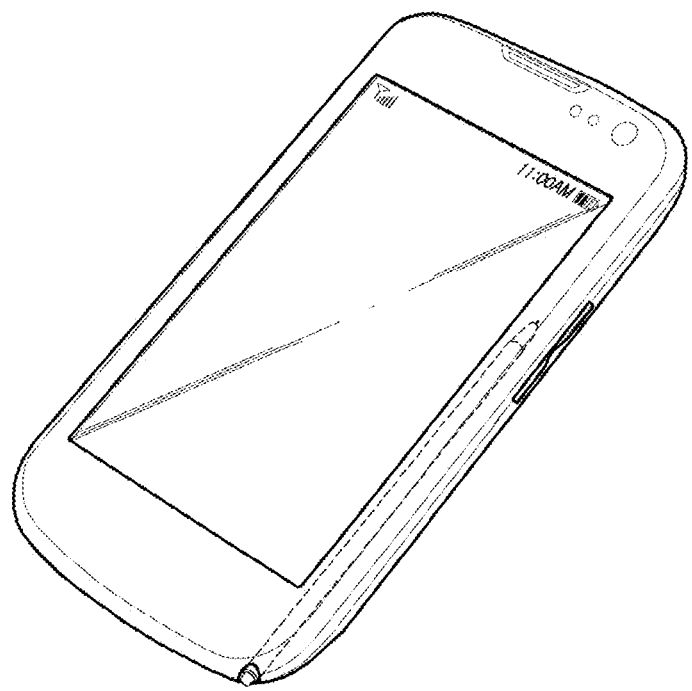
FIGS. 6A and 6B illustrate a situation in which a pen control mode is activated in an electronic device according to an embodiment of the present disclosure.
Figure 6B:
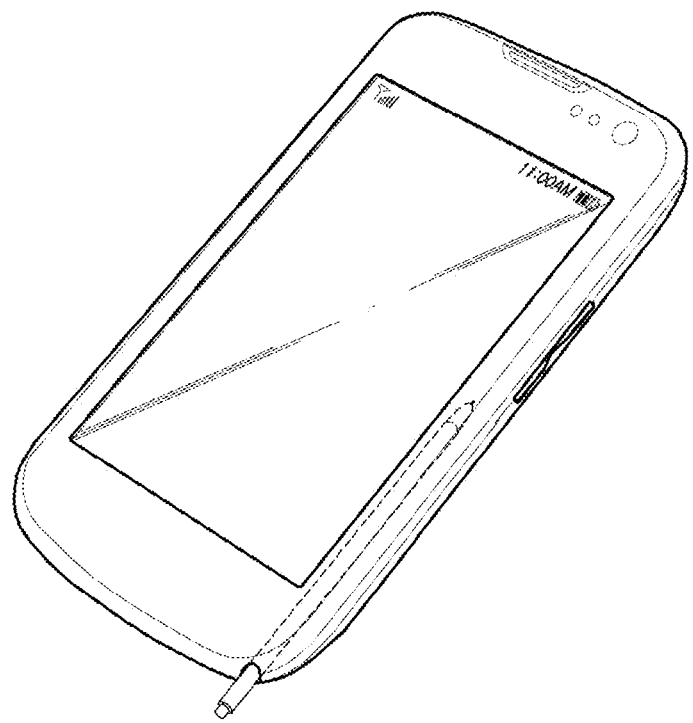

FIGS. 6A and 6B illustrate a situation in which a pen control mode is activated in an electronic device according to an embodiment of the present disclosure.

Referring to FIGS. 6A and 6B, the electronic device may activate the pen control mode by detecting an interrupt generated by the electronic pen or an interrupt generate by a menu selection of a user.

Herein, the interrupt generated by the menu selection of the user may be generated by an input of an input button included in the electronic device or may be generated by a gesture of a user who selects a displayed menu.

In addition, the interrupt generated by the electronic pen may be generated by a motion of the electronic pen.

As described above, the electronic unit may activate the pen control mode by detecting the interrupt generated according to the change in the state of the rotation unit.

For another example, the electronic device may change an insertion state of the electronic pen in a shape of a push/pull type. Herein, the insertion state of the electronic pen is changed when the electronic pen inserted to the electronic device is pulled out according to a behavior of a user who presses the inserted electronic pen. That is, the electronic device of the present disclosure may generate an interrupt for controlling the pen control mode according to the change in the insertion state of electronic pen as described above, and the electronic unit may activate the pen control mode by detecting the interrupt generated according to the change in the insertion state of the electronic pen.

FIG. 6A illustrates a state in which the electronic pen is inserted to the electronic device, and FIG. 6B illustrates a situation in which the electronic pen inserted to the electronic device is pulled out to an outer side.

Figure 7A:
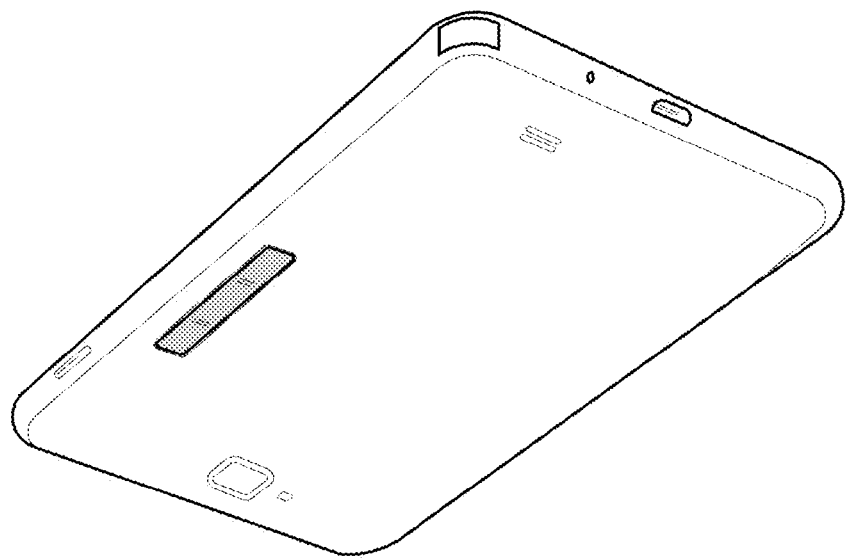
FIGS. 7A and 7B illustrate a situation in which a pen control mode is activated in an electronic device according to an embodiment of the present disclosure.
Figure 7B:
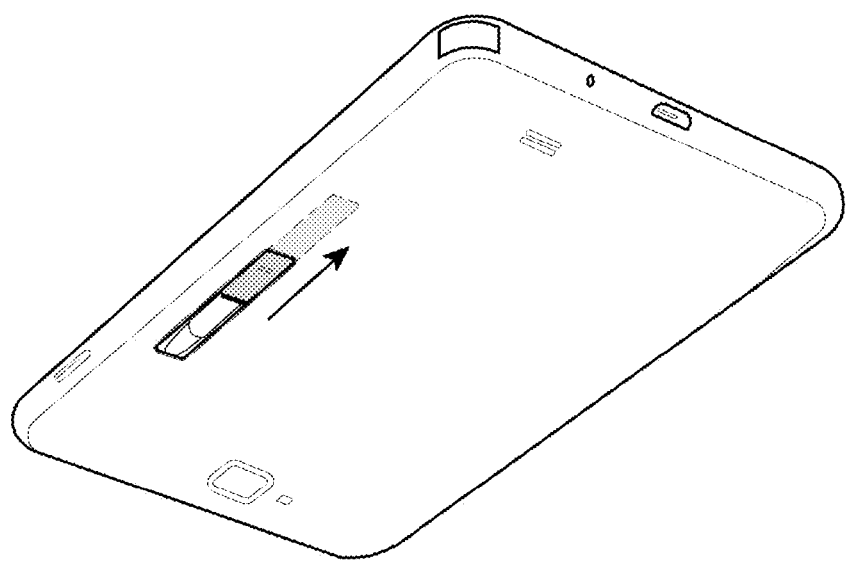

FIGS. 7A and 7B illustrate a situation in which a pen control mode is activated in an electronic device according to an embodiment of the present disclosure.

Referring to FIGS. 7A and 7B, the electronic device may include a circuit capable of determining strength of a magnetic field, and may include a magnetic material of the electronic pen. The electronic device has a structure in which a motion of the electronic pen can be changed.

According to an embodiment, the electronic device may have a cover mounted thereon to partially open and close a case. Such a cover may be open/closed in a slide or foldable manner.

The cover may be disposed to a specific area of a location at which the electronic pen is inserted, and thus even if the electronic pen is inserted, the electronic pen may protrude when the cover is open.

That is, a user of the electronic device may open the cover and rotate the protruding electronic pen by using a hand.

A circuit capable of determining the strength of the magnetic field according to a motion of the electronic pen which rotates by the user may confirm the motion for the strength of the magnetic field as to the motion of the electronic pen and may perform a function corresponding to a pre-set motion.

The user who uses the electronic device may change the motion of the electronic pen exposed by the cover which is open by using one finger in a state in which the user grabs the electronic device.

FIG. 7A illustrates a state in which a cover mounted on a specific portion of a case of the electronic device is closed, and FIG. 7B illustrates a state in which an inserted electronic pen is exposed when the cover mounted on the specific portion of the case of the electronic device is open.

FIGS. 8A, 8B, and 8C illustrate a process of controlling a web browser execution screen by using a motion of an electronic pen in an electronic device according to an embodiment of the present disclosure.

Referring to FIGS. 8A to 8C, the electronic device displays a screen corresponding to a web address via a web browser executed by a user.

In general, the electronic device scrolls a currently displayed screen by detecting a gesture of the user.

However, the electronic device of the present disclosure may define a function of the web browser to a motion of the electronic pen.

For example, the electronic device may define a scroll direction of an output screen according to a rotation direction of the electronic pen.

That is, the output screen may be scrolled in a first direction (i.e., an upward direction) as to a first motion in which the electronic pen rotates in a first direction (i.e., from down to up), and the output screen may be scrolled in a second direction (i.e., a downward direction) as to a second motion in which the electronic pen rotates in a second direction (i.e., from up to down).

When the web browser is executed by the user, the electronic device displays a web screen (see 800) as illustrated in FIG. 8A.

In addition, upon detection of a motion of the electronic pen for scrolling the web screen in the upward direction (see 801) as illustrated in FIG. 8B, the electronic device scrolls a currently output web screen in the upward direction.

In addition, upon detection of a motion of the electronic pen for scrolling the web screen in the downward direction (see 803) as illustrated in FIG. 8C, the electronic device scrolls a currently output web screen in the downward direction.

As described above, a function of the web browser may be controlled by a motion change in a state in which the electronic pen is completely inserted, a state in which the electronic pen is partially inserted, and a state in which the electronic pen is pulled out from the electronic device.

In addition, the electronic device may provide a function capable of changing or defining a function that can be controlled by the motion of the electronic pen.

Figure 9A:
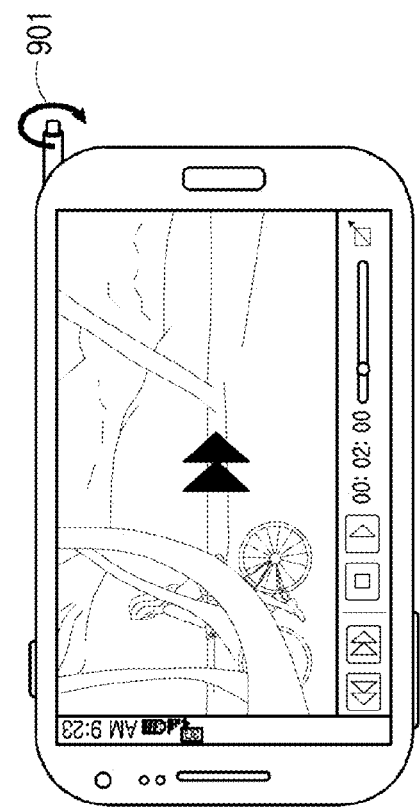
FIGS. 9A, 9B, and 9C illustrate a process of controlling an operation of a multimedia player by using a motion of an electronic pen in an electronic device according to an embodiment of the present disclosure.
Figure 9B:
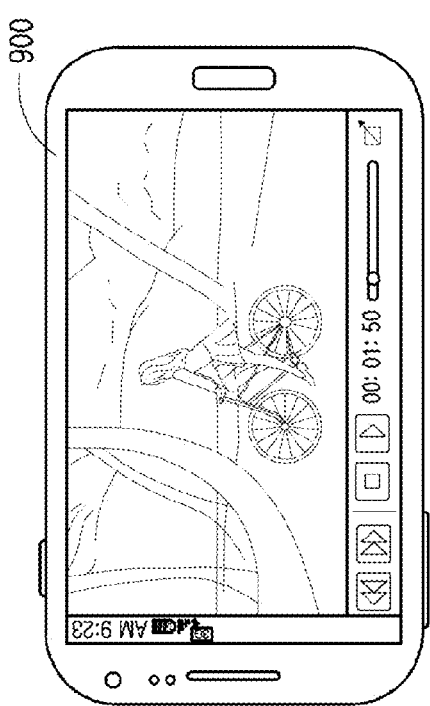
Figure 9C:
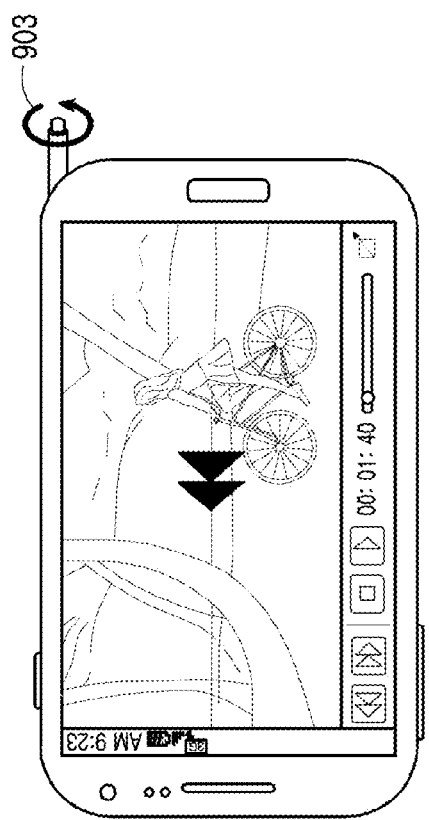

FIGS. 9A, 9B, and 9C illustrate a process of controlling an operation of a multimedia player by using a motion of an electronic pen in an electronic device according to an embodiment of the present disclosure.

Referring to FIGS. 9A to 9C, the electronic device may play back multimedia data via a multimedia player executed by a user, and may display a playback screen.

In general, the electronic device may change a playback start time of the multimedia data by detecting a gesture of the user.

However, the electronic device of the present disclosure can define a change direction of the playback start time by a motion of the electronic pen.

For example, the electronic device may define a playback direction of the multimedia data according to a rotation direction of the electronic pen.

That is, the playback start time may be changed in a first direction (i.e., a next direction) as to a first motion in which the electronic pen rotates in a first direction (i.e., from down to up), and the playback start time may be changed in a second direction (i.e., a previous direction) as to a second motion in which the electronic pen rotates in a second direction (i.e., from up to down).

The electronic device displays a screen in which the multimedia data is played back (see 900) as illustrated in FIG. 9A when the multimedia player is executed by the user.

In addition, upon detection of a motion of the electronic pen for executing a fast forward function (see 901) as illustrated in FIG. 9B, the electronic device changes the playback start time of the data to a right side, and displays a data playback screen of the changed start time.

In addition, upon detection of the electronic pen for executing a rewind function (see 903) as illustrated in FIG. 9C, the electronic device changes the playback start time of the data to a left side, and displays a data playback screen of the changed start time.

The aforementioned function of the multimedia player may be controlled by a motion change in a state in which the electronic pen is completely inserted, a state in which the electronic pen is partially inserted, and a state in which the electronic pen is pulled out from the electronic device.

FIGS. 10A, 10B, and 10C illustrate a process of controlling an operation of an image viewer by using a motion of an electronic pen in an electronic device according to an embodiment of the present disclosure.

Referring to FIGS. 10A to 10C, the electronic device may display image data via the image viewer executed by a user.

In general, by detecting a gesture of the user, the electronic device may change a display ratio in such a manner that a displayed image is enlarged or shrunk.

However, the electronic device of the present disclosure may enlarge or shrink the displayed image according to a motion of the electronic pen by defining the display ratio to the motion of the electronic pen.

For example, the electronic device may define the display ratio according to a rotation direction of the electronic pen.

That is, the display ratio may be changed to a first ratio (i.e., an enlargement ratio) as to a first motion in which the electronic pen rotates in a first direction (i.e., from down to up), and the display ratio may be changed to a second ratio (i.e., a shrinkage ratio) as to a second motion in which the electronic pen rotates in a second direction (i.e., from up to down).

When the image viewer is executed by the user, the electronic device displays an image selected by the user (see 1000) as illustrated in FIG. 10A.

In addition, upon detection of a motion of the electronic pen for enlarging the displayed image (see 1001) as illustrated in FIG. 10B, the electronic device displays the image by changing a ratio of the displayed image to the enlargement ratio.

In addition, upon detection of a motion of the electronic pen for shrinking the displayed image (see 1003) as illustrated in FIG. 10C, the electronic device displays the image by changing the ratio of the displayed image to the shrinkage ratio.

As described above, a function of the image viewer may be controlled by a motion change in a state in which the electronic pen is completely inserted, a state in which the electronic pen is partially inserted, and a state in which the electronic pen is pulled out from the electronic device.

Figure 11A:
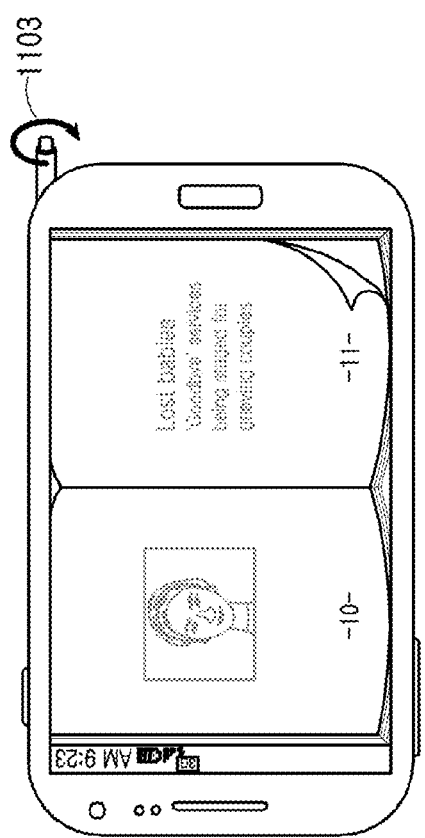
FIGS. 11A, 11B, and 11C illustrate a process of controlling an operation of an e-book viewer by using a motion of an electronic pen in an electronic device according to an embodiment of the present disclosure.
Figure 11B:
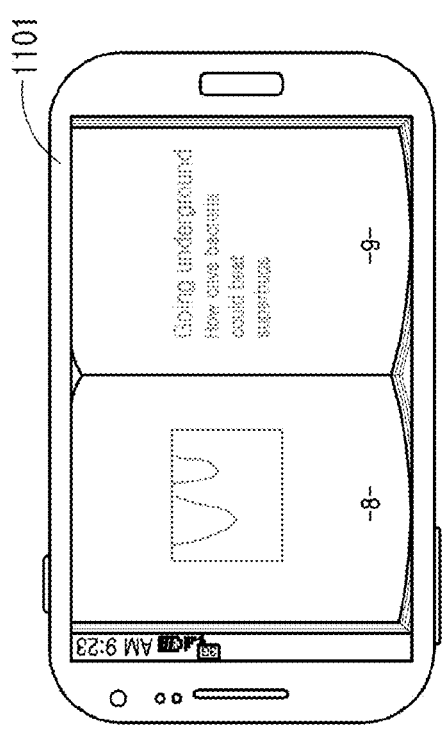
Figure 11C:
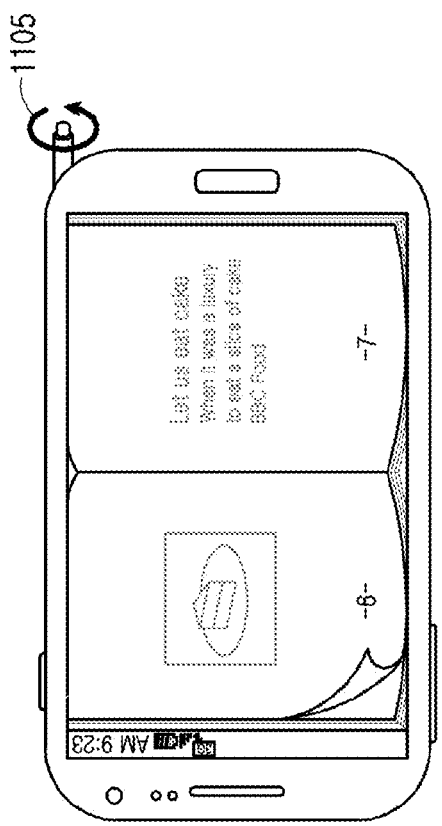

FIGS. 11A, 11B and 11C illustrate a process of controlling an operation of an e-book viewer by using a motion of an electronic pen in an electronic device according to an embodiment of the present disclosure.

Referring to FIGS. 11A to 11C, the electronic device may display an e-book content via the e-book viewer executed by a user.

In general, the electronic device may change a page of the displayed e-book content by detecting a gesture of the user.

However, the electronic device of the present disclosure may change the displayed page to a previous or next page on the basis of a motion of the electronic pen by defining a page change direction to the motion of the electronic pen.

For example, the electronic device may define the page change direction according to a rotation direction of the electronic pen.

That is, the page is displayed by changing to a first direction (i.e., a next page) as to a first motion in which the electronic pen rotates in a first direction (i.e., from down to up), and the page may be displayed by changing to a second direction (i.e., a previous page) as to a second motion in which the electronic pen rotates in a second direction (i.e., from up to down).

Referring to FIG. 11A, when the e-book viewer is executed by the user, the electronic device displays an e-book content selected by the user (see 1101) as illustrated.

In addition, upon detection of a motion of the electronic pen for changing the e-book content to a next page (see 1103) as illustrated in FIG. 11B, the electronic device displays the content by changing a current page of the content to the next page.

In addition, upon detection of a motion of the electronic pen for changing the e-book content to a previous page (see 1105) as illustrated in FIG. 11C, the electronic device displays the content by changing the current page of the content to the previous page.

As described above, a function of the e-book viewer may be controlled by a motion change in a state in which the electronic pen is completely inserted, a state in which the electronic pen is partially inserted, and a state in which the electronic pen is pulled out from the electronic device.

Figure 12A:
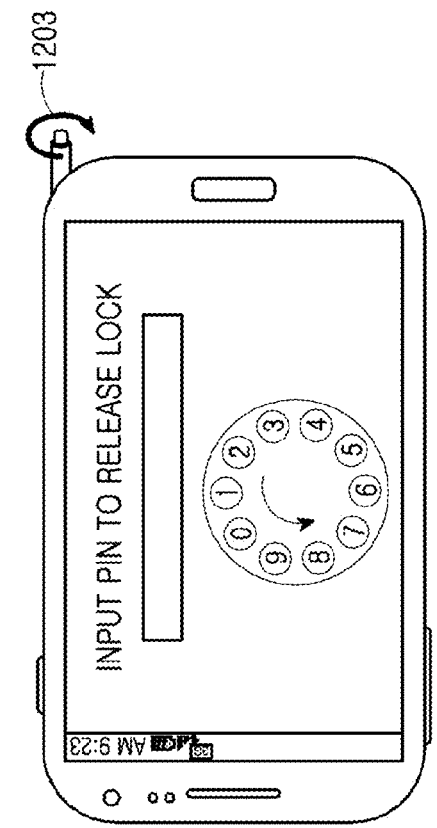
FIGS. 12A, 12B, and 12C illustrates a process of controlling a lock function by using a motion of an electronic pen in an electronic device according to an embodiment of the present disclosure.
Figure 12B:
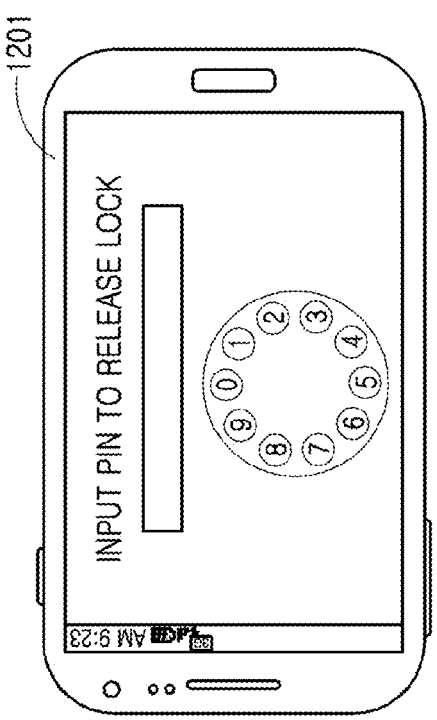
Figure 12C:
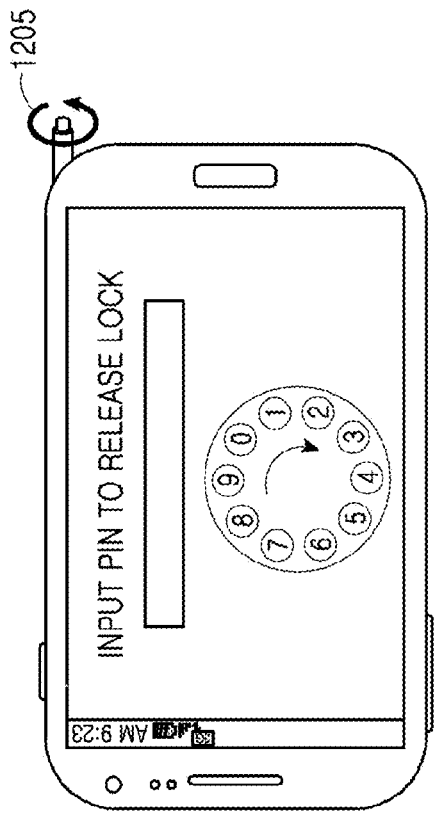

FIGS. 12A, 12B, and 12C illustrate a process of controlling a lock function by using a motion of an electronic pen in an electronic device according to an embodiment of the present disclosure.

Referring to FIGS. 12A to 12C, when a pre-set condition is satisfied, the electronic device activates a lock function by displaying a screen for indicating that the lock function is enabled. A situation in which a condition for activating the lock function is satisfied may be a situation in which a gesture of a user who activates the lock function is detected or a situation in which an input of the user is not detected for a specific period of time.

In general, the electronic device must release the lock function by inputting a pre-set pattern in a state in which the lock function is enabled or by directly inputting a pre-set serial number.

However, the electronic device of the present disclosure may select information required to release the lock function on the basis of a motion of the electronic pen.

For example, the electronic device displays a plurality of pieces of information on a screen for releasing the enabled lock function. Herein, only information pre-set by the user is used to release the lock function among the displayed plurality of pieces of information.

In addition, the electronic device may define a direction for selecting the information according to a rotation direction of the electronic pen.

That is, a location of the information may be changed in a first direction (i.e., a clockwise direction) as to a first motion in which the electronic pen rotates in a first direction (e.g., from down to up), and the location of the information may be changed in a second direction (i.e., a counterclockwise direction) as to a second motion in which the electronic pen rotates in a second direction (i.e., from up to down).

When the lock function is enabled, the electronic device displays a screen for indicating that the lock function is enabled (see 1201) as illustrated in FIG. 12A.

A plurality of pieces of information (i.e., numbers) used to release the lock function is included in the displayed screen, and the user may release the lock function by selecting pre-set information among the plurality of pieces of information.

In this case, the electronic device may detect a gesture of the user who directly selects the displayed information and thus may confirm whether information for releasing the lock function is input.

For another example, the electronic device may allow the displayed information to rotate, and may define information existing in a pre-set location to information selected by the user. In this case, the electronic device may rotate the displayed information on the basis of a motion of the electronic pen according to the embodiment of the present disclosure.

That is, upon detection of a motion of the electronic pen for rotating the displayed information in a counterclockwise direction (see 1203) as illustrated in FIG. 12B, the electronic device may move the location of the currently displayed information by one step in a counterclockwise direction.

In addition, upon detection of a motion of the electronic pen for rotating the displayed information in a clockwise direction (see 1205) as illustrated in FIG. 12C, the electronic device may move the location of the currently displayed information by one step in a clockwise direction.

Figure 13A:
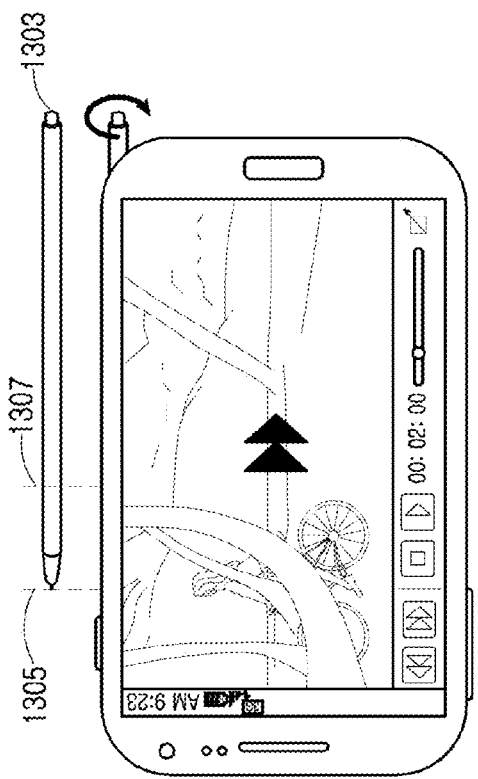
FIGS. 13A, 13B, and 13C illustrate a process of controlling a multimedia player by using a motion of an electronic pen in an electronic device according to another embodiment of the present disclosure.
Figure 13B:
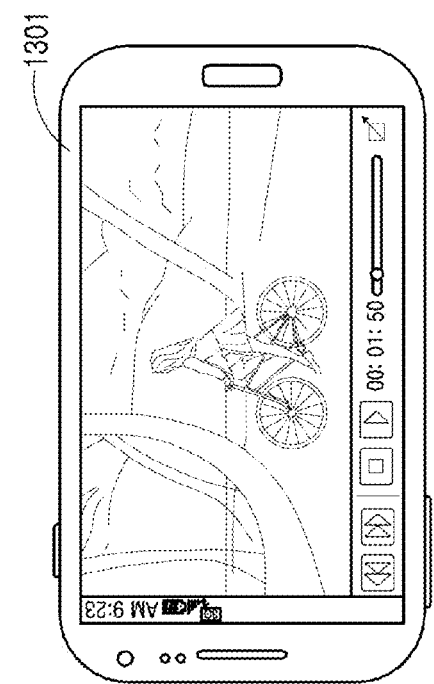
Figure 13C:
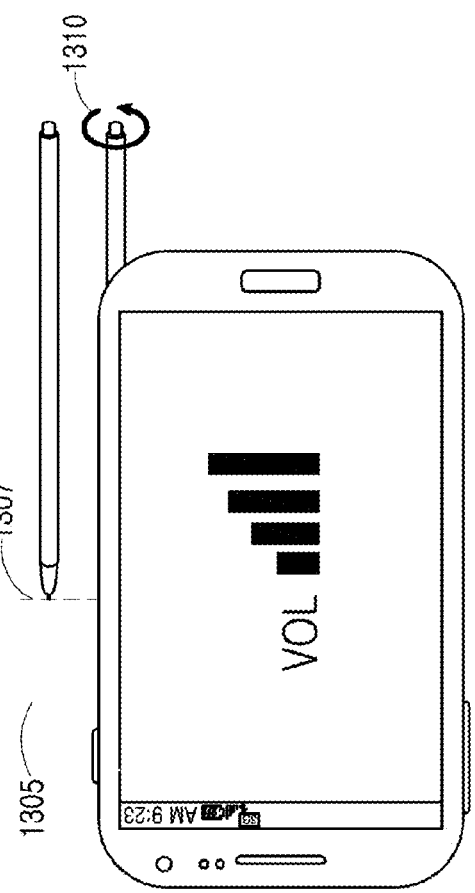

FIGS. 13A, 13B, and 13C illustrate a process of controlling a multimedia player by using a motion of an electronic pen in an electronic device according to another embodiment of the present disclosure.

Referring to FIGS. 13A to 13C, the electronic device may play back multimedia data via a multimedia player executed by a user, and may display a playback screen.

In general, the electronic device may change a playback start time or sound volume of the multimedia data by detecting a gesture of the user. That is, a gesture for controlling the playback start time of the data and a gesture for regulating the sound volume are separated.

However, the electronic device of the present disclosure may control the multimedia player by using a motion of the electronic pen.

Herein, the motion of the electronic pen may be not only a rotation state but also an insertion state. The reason of distinguishing the motion of the electronic pen not only to the rotation state but also to the insertion state is to increase a type of function that can be controlled by the electronic pen.

For example, the electronic device may control an operation of the multimedia player according to a rotation direction of the electronic pen. The electronic pen may change its motion only in a first direction and a second direction. This means that, when considering only the rotation state of the electronic pen, the multimedia player can be controlled only in the first direction and the second direction.

If the rotation state and insertion state of the electronic pen are considered, functions that can be controlled may be greater in number than those of a case where only the rotation state is considered.

Herein, the insertion state of the electronic pen implies a level of inserting the electronic pen. The electronic device of the present disclosure may define a plurality of insertion sections and thus define a different control scheme for each section.

That is, the electronic device may define a state in which the electronic pen is completely inserted as a state of being inserted to a first insertion section, and may define a state in which the electronic pen is inserted by half as a state of being inserted to a second insertion section.

The electronic device may use a rotation state of the electronic pen inserted to the first insertion section as a condition for controlling a playback start time of the multimedia player, and may use a rotation state of the electronic pen inserted to the second insertion section as a condition for controlling a sound volume of the multimedia player.

The insertion state of the electronic pen may be determined by a circuit which is included in the electronic device and which measures strength of a magnetic field generated by a magnetic material inside the electronic pen.

The electronic device displays a screen in which the multimedia data is played back (see 1301) when the multimedia player is executed by the user as illustrated in FIG. 13A.

In addition, if an electronic pen 1303 is inserted to a first insertion section as illustrated in FIG. 13B, the playback start time may change according to the rotation state of the electronic pen 1303.

As illustrated above, when the electronic pen 1303 is completely inserted, a section between a point 1305 at which a tip of the electronic pen is located and a pre-set boundary point 1307 is defined as the first insertion section. Herein, the pre-set boundary point 1307 implies a boundary between the first insertion section and the second insertion section. If the magnetic material of the electronic pen 1303 is located in the first insertion section, the electronic device may determine that the electronic pen 1303 is inserted to the first insertion section.

In addition, when the electronic pen is inserted to the second insertion section as illustrated in FIG. 13C, the electronic device may change a sound volume according to a rotation state 1310 of the electronic pen 1303.

As illustrated, if the magnetic material of the electronic pen 1303 is deviated from the first insertion section and is located in another section (i.e., the second insertion section), the electronic device may determine that the electronic pen 1303 is inserted to the second insertion section.

An electronic device of the present disclosure detects the strength of a magnetic field which varies depending on a motion change of an electronic pen that includes a magnetic material, determines a motion of the electronic pen by using the detected strength of the magnetic field, and confirms an operation corresponding to the determined motion to perform the operation.

According to various embodiments of the present disclosure, a method of controlling a function of the electronic device may include determining a motion of an electronic pen inserted to the electronic device, and confirming an operation corresponding to the determined motion of the electronic pen to perform the operation.

According to various embodiments of the present disclosure, the motion of the electronic pen may include at least any one of a change in an insertion state of the electronic pen and a rotation of the electronic pen.

According to various embodiments of the present disclosure, the method of controlling the function of the electronic device may include, after determining the motion of the electronic pen by using strength of a magnetic field, confirming whether a button of the electron pen is input, and confirming an operation corresponding to the input button to perform the operation.

According to various embodiments of the present disclosure, a state of the electronic pen inserted to the electronic device may include any one of a state in which the electronic pen is completely inserted, a state in which the electronic pen is partially inserted, and a state in which the electronic pen is pulled out.

According to various embodiments of the present disclosure, the method of controlling the function of the electronic device may include receiving determined motion information from the electronic pen.

According to various embodiments of the present disclosure, the motion of the electronic pen may be determined on the basis of at least any one of a voltage level which varies depending on a magnetic material and strength of a magnetic field, an impedance value, and information obtained by a sensor included in the electronic pen.

Each of the aforementioned constitutional elements of the electronic device of according to the present disclosure may consist of one or more components, and names thereof may vary depending on a type of electronic device. The electronic device according to the present disclosure may include at least one of the aforementioned constitutional elements. Some of the constitutional elements may be omitted, or additional other constitutional elements may be further included. In addition, some of the constitutional elements of the electronic device according to the present disclosure may be combined and constructed to one entity, so as to equally perform functions of corresponding constitutional elements before combination.

A term used as a constitutional element in the present disclosure, for example, a "module", may imply a unit including, for example, one of hardware, software, and firmware or a combination of two or more of them. The "module" may be interchangeably used with a term such as a unit, a logic, a logical block, a component, a circuit, etc. The "module" may be a minimum unit of an integrally constituted component or may be a part thereof. The "module" may be a minimum unit for performing one or more functions or may be a part thereof The "module" may be mechanically or electrically implemented. For example, the "module" of the present disclosure may include at least one of an Application-Specific Integrated Circuit (ASIC) chip, a Field-Programmable Gate Arrays (FPGAs), and a programmable-logic device, which are known or will be developed and which perform certain operations.

According to various embodiments, at least some parts of a device (e.g., modules or functions thereof) or method (e.g., operations) of the present disclosure may be implemented with an instruction stored in a computer-readable storage media for example. If the instruction is executed by one or more processors, the one or more processors may perform a function corresponding to the instruction. The computer-readable storage media may be a memory for example. At least some parts of the programming module may be implemented (e.g., executed) by the processor. At least some parts of the programming module may include modules, programs, routines, sets of instructions, processes, etc., for performing one or more functions.

The computer readable recording medium may be a hardware device configured particularly to store and perform a program instruction (e.g., program module), for example, a hard disk, a magnetic medium such as a floppy disc and a magnetic tape, an optical storage medium such as a Compact Disc-ROM (CD-ROM) or a Digital Versatile Disc (DVD), a magnetic-optic medium such as a floptical disc, a Read Only Memory (ROM), a Random Access Memory (RAM), a flash memory, etc. An example of the program instruction includes not only a machine language created by a compiler but also a high-level language executable by a computer by using an interpreter or the like. The aforementioned hardware device may be configured to operate as one or more software modules to perform the operation of the present disclosure, and the other way around is also possible.

The module or programming module according to the present disclosure may further include at least one or more constitutional elements among the aforementioned constitutional elements, or may omit some of the constitutional elements, or may further include additional other constitutional elements. Operations performed by a module, programming module, or other constitutional elements of the present disclosure may be executed in a sequential, parallel, repetitive, or heuristic manner. In addition, some of the operations may be executed in a different order or may be omitted, or other operations may be added.

According to various embodiments, in a storage medium for storing instructions, the instructions are configured to allow at least one processor to perform at least one operation when the instructions are executed by the at least one processor. The at least one operation may include an operation of determining a motion of an electronic pen inserted to the electronic device and an operation for confirming an operation corresponding to the determined motion of the electronic pen to perform the operation.

As described above, by controlling a function of the electronic device on the basis of the motion of the electronic pen, the present disclosure provides an input means having increased functionality.

In addition, the present disclosure can increase the utilization of the electronic pen by controlling a function by the use of the electronic pen inserted to the electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device including an electronic pen insertable thereinto, and a processor-implemented controller, wherein the electronic pen comprises a first part and a second part rotatable coupled to the first part, the method comprising:
   detecting, by the controller, a moving of the second part while the electronic pen is inserted into the electronic device so that at least a part of the second part is protruded outside the electronic device;
   in response to the detection of the moving of the second part, entering a pen control mode;
   detecting, by the controller, a rotation of the second part of the electronic pen in the pen control mode; and
   performing, by the controller, at least one function based on the detected rotation of the second part of the electronic pen in the pen control mode.

2. The method of claim 1, wherein the performing comprises:
   determining the at least one function based on at least one of a rotation direction and a rotation angle of the second part of the electronic pen.

3. The method of claim 2, wherein the performing comprises:
   in response to a clockwise rotation of the second part of the electronic pen, scrolling contents displayed on a screen of the electronic device in a first direction; and
   in response to a counterclockwise rotation of the second part of the electronic pen, scrolling the contents displayed on the screen of the electronic device in a second direction opposite to the first direction.

4. The method of claim 2, wherein the performing comprises:
   in response to a clockwise rotation of the second part of the electronic pen, zooming in contents displayed on a screen of the electronic device; and
   in response to a counterclockwise rotation of the second part of the electronic pen, zooming out the contents displayed on the screen of the electronic device.

5. The method of claim 1, wherein the detection of the moving of the second part comprises:
   detecting that the electronic pen is moved from a first position where the electronic pen is completely inserted into the electronic device to a second position where the electronic pen is partially inserted into the electronic device.

6. The method of claim 5, further comprising:
   selecting the at least one function among a plurality of functions based on a degree where the electronic pen is partially inserted into the electronic device.

7. The method of claim 1, further comprising:
   detecting, by the electronic device, that the electronic pen is separated from the electronic device;
   wirelessly receiving, from the electronic pen, motion information of the electronic pen; and
   performing at least one second function based on at least the received motion information of the electronic pen.

8. The method of claim 1, wherein the rotation of the second part of the electronic pen is detected based at least in part on values associated with the electromagnetic interaction between the electronic device and the electronic pen.

9. The method of claim 1, wherein the second part is moved from inside to outside the first part.

10. The method of claim 1, wherein the second part is moved via a pull or push manipulation of the second part.

11. The electronic device of claim 1, wherein the second part is moved via a pull or push manipulation of the second part.

12. An electronic device comprising:
an electronic pen insertable into the electronic device and comprising a first part and a second part rotatably coupled to the first part;
a memory configured to store programs in association with functions; and
a processor-implemented controller operatively coupled with the memory, the processor-implemented controller configured to:
detect a moving of the second part while the electronic pen is inserted into the electronic device so that at least a part of the second part is protruded outside of the electronic device;
in response to the detection of the moving of the second part, enter a pen control mode;
detect a rotation of the second part of the electronic pen in the pen control mode; and
perform at least one function based on the detected rotation of the second part of the electronic pen in the pen control mode.

13. The electronic device of claim 12, wherein the controller is further configured to determine the at least one function based on at least one of a rotation direction and a rotation angel of the second part of the electronic pen.

14. The electronic device of claim 13, wherein the controller is further configured to:
in response to a clockwise rotation of the second part of the electronic pen, scroll contents displayed on a screen of the electronic device in a first direction; and
in response to a counterclockwise rotation of the second part of the electronic pen, scroll the contents displayed on the screen of the electronic device in a second direction opposite to the first direction.

15. The electronic device of claim 13, wherein the controller is further configured to:
in response to a clockwise rotation of the second part of the electronic pen, zoom in contents displayed on a screen of the electronic device; and
in response to a counterclockwise rotation of the second part of the electronic pen, zoom out the contents displayed on the screen of the electronic device.

16. The electronic device of claim 12, wherein the controller is further configured to:
detect that the electronic pen is moved from a first position where the electronic pen is completely inserted into the electronic device to a second position where the electronic pen is partially inserted into the electronic device.

17. The electronic device of claim 16, wherein the controller is further configured to select the at least one function among a plurality of functions based on a degree where the electronic pen is partially inserted into the electronic device.

18. The electronic device of claim 12, wherein the controller is further configured to:
detect that the electronic pen is separated from the electronic device;
wirelessly receive, from the electronic pen, motion information of the electronic pen; and
perform at least one second function based on at least the received motion information of the electronic pen.

19. The electronic device of claim 12, wherein the controller is further configured to detect the rotation of the second part of the electronic pen based at least in part on values associated with the electromagnetic interaction between the electronic device and the electronic pen.

20. The electronic device of claim 12, wherein the second part is moved from inside to outside the first part.

* * * * *